US012689673B2

(12) United States Patent
    Zinner

(10) Patent No.: US 12,689,673 B2
(45) Date of Patent: Jul. 21, 2026

(54) METHOD FOR OPERATING A CONTROL SYSTEM, AND CONTROL SYSTEM

(71) Applicant: CARIAD SE, Wolfsburg (DE)

(72) Inventor: Helge Zinner, Wolfsburg (DE)

(73) Assignee: CARIAD SE, Wolfsburg (DE)

( * ) Notice: Subject to any disclaimer, the term of this patent is extended or adjusted under 35 U.S.C. 154(b) by 0 days.

(21) Appl. No.: 18/943,702

(22) Filed: Nov. 11, 2024

(65) Prior Publication Data

US 2025/0159049 A1      May 15, 2025

(30) Foreign Application Priority Data

Nov. 13, 2023    (DE) .......................... 102023131530.7

(51) Int. Cl.
    *H04L 67/12*        (2022.01)
    *B60W 50/00*        (2006.01)
    *G06F 9/48*         (2006.01)
    *H04L 43/0805*      (2022.01)

(52) U.S. Cl.
    CPC ............. *H04L 67/12* (2013.01); *B60W 50/00* (2013.01); *G06F 9/4881* (2013.01); *H04L 43/0805* (2013.01); *B60W 2556/45* (2020.02)

(58) Field of Classification Search
    None
    See application file for complete search history.

(56) References Cited

U.S. PATENT DOCUMENTS

| | | | | |
|---|---|---|---|---|
| 8,520,695 | B1 * | 8/2013 | Rubin ................... | H04W 72/30 |
| | | | | 370/445 |
| 2008/0052387 | A1 * | 2/2008 | Heinz ................... | H04L 67/535 |
| | | | | 709/223 |

| | | | | |
|---|---|---|---|---|
| 2018/0123932 | A1 * | 5/2018 | Shaw .................. | H04L 41/0806 |
| 2019/0313446 | A1 | 10/2019 | Kim et al. | |
| 2022/0108564 | A1 * | 4/2022 | O'Sullivan .............. | G08G 1/20 |
| 2024/0154907 | A1 * | 5/2024 | Biswas ............... | G06F 9/45558 |
| 2024/0179076 | A1 * | 5/2024 | Kommula .......... | H04L 63/1458 |

FOREIGN PATENT DOCUMENTS

| | | | |
|---|---|---|---|
| DE | 10-2019-206193 | A1 | 11/2020 |
| DE | 10-2020-209221 | A1 | 1/2022 |
| DE | 10-2020-215086 | A1 | 6/2022 |
| DE | 10-2020-215329 | A1 | 6/2022 |

OTHER PUBLICATIONS

Decker, "The 10Mbit/s Domain and the Software Defined Vehicle CAN FD SIC, 10BASE-TIS and CAN XL on the Way to SDV," Automobil Elektonik, Feb. 2023. (5 pages).

* cited by examiner

*Primary Examiner* — Raqiul A Choudhury

(74) *Attorney, Agent, or Firm* — Seed Intellectual Property Law Group LLP

(57)        ABSTRACT

The disclosure relates to a method for operating a control system of a vehicle that includes at least two controllers, wherein, for data transfer, the controllers are at least temporarily communicatively linked via a network, wherein the data transfer in the network takes place according to a round-robin method, so that all controllers are assigned temporally consecutive transmission slots for data transfer and wherein at least one controller is configured, at least temporarily, as a server controller and wherein at least one controller is configured, at least temporarily, as a client controller.

13 Claims, 2 Drawing Sheets

100
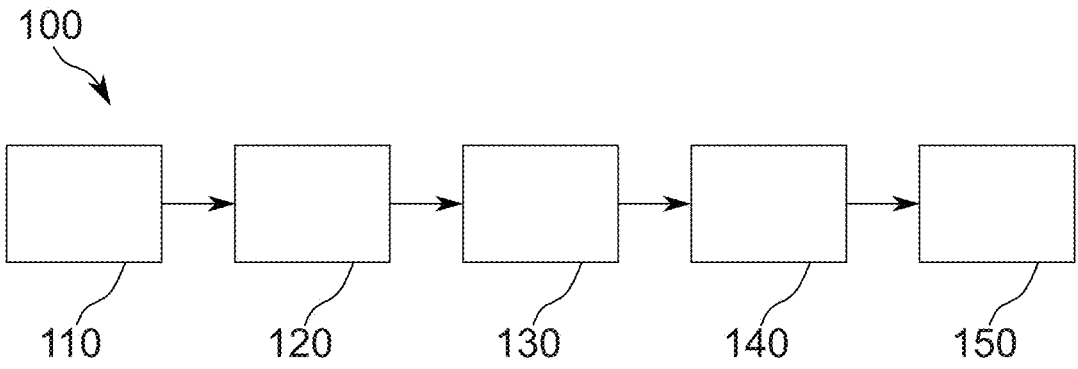
110    120    130    140    150
Fig. 1
10
12
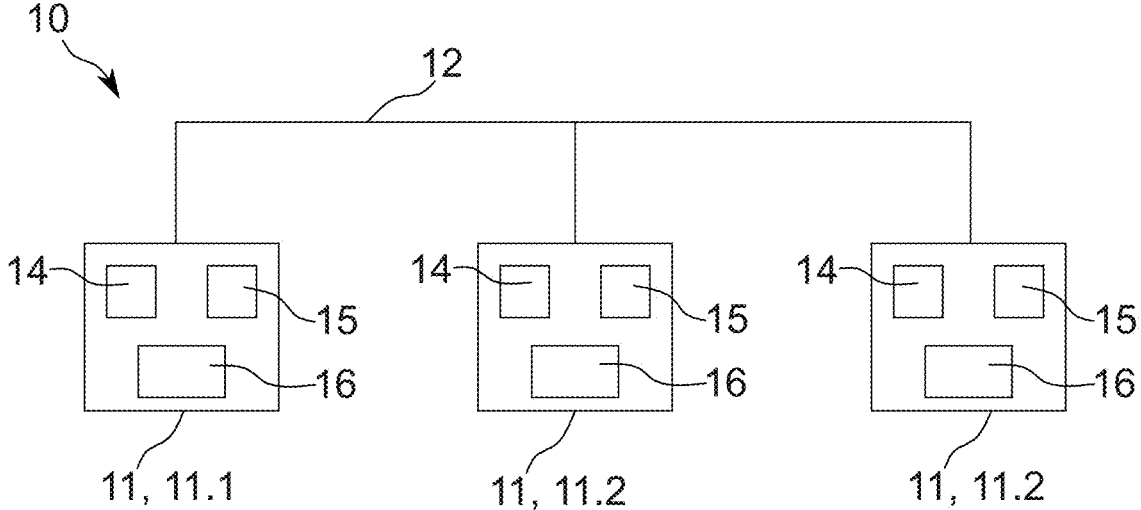
14    15    16
11, 11.1    11, 11.2    11, 11.2
Fig. 2
Z
13    13    13
T
Fig. 3
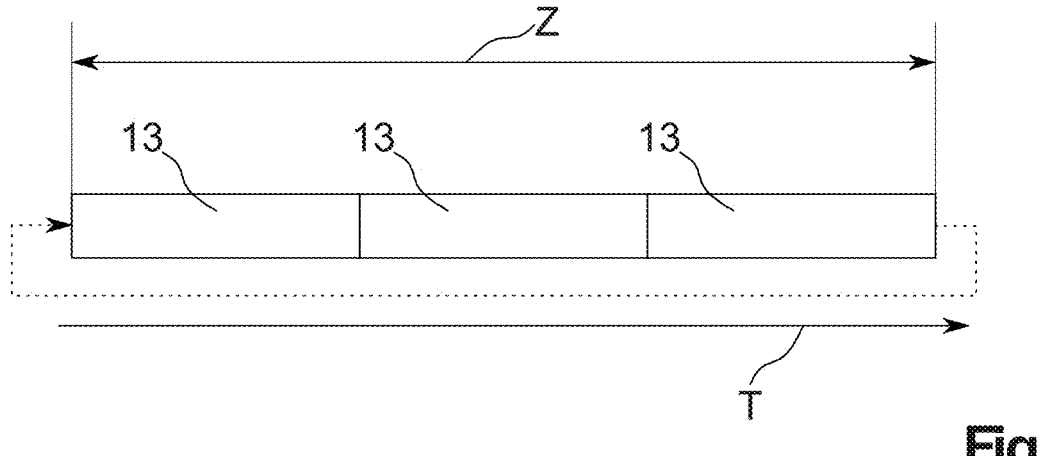

METHOD FOR OPERATING A CONTROL SYSTEM, AND CONTROL SYSTEM

BACKGROUND

Technical Field

The disclosure relates to a method, a control system, a vehicle, a computer-readable storage medium, and a data carrier signal.

Description of the Related Art

In modern vehicles, a large amount of data is detected, communicated and further processed. Data that is detected in one place is often needed in the context of several vehicle systems or applications and further processed in this context or merely presented to a user. This data can be both sensor-detected parameters, such as, for example, tire pressure or a GPS position of the vehicle, and user-specific input parameters, such as, for example, a selected display layout or a speedometer display in km/h or mph.

If, for example, a tire pressure is detected by a sensor, in particular by a tire pressure sensor, this tire pressure is of interest to the vehicle's tire pressure monitoring system, which compares the tire pressure with a reference value and ascertains safety-relevant deviations. At the same time, the tire pressure may also be of interest to other vehicle systems such as, for example, an HMI (Human-Machine Interface) of the vehicle, which displays the tire pressure to a user of the vehicle on a display.

Data within a vehicle is usually distributed based on service-oriented communication. This means that individual vehicle systems make their data available to potential customers (other vehicle systems) within the scope of so-called services, and these customers can subscribe to one or more services as needed.

One possible approach in that regard is that a controller (server controller), which controls or operates at least one vehicle system, such as, for example, tire pressure detection and/or vehicle position detection, transmits a service offering message to at least one other controller (client controller), or to several other controllers (client controller). The subject of the service offering message is, which services can be offered to the client controller by the server controller. The client controller, in particular at least one vehicle system operated by the client controller, can now in turn subscribe to at least one service offered by the client controller, in particular by transmission of a corresponding response to the server controller (subscription confirmation). Subsequently, the server controller will transmit the data relating to the subscribed service (e.g., a tire pressure, a GPS position of the vehicle, etc.) to the client controller or to the relevant vehicle system operated by the client controller, at least for a limited period of time. Based on this approach it is ensured, that data is transmitted only then and only there, when or where it is needed, as a result of which the data traffic within the vehicle can be reduced overall.

In-vehicle communication between two or more controllers usually takes place via a network, in particular Ethernet. For this purpose, so-called switches are used, which form central communication nodes within the network and ensure that the data transmitted by a network participant (e.g., a service offering message) is properly delivered to the other participants. This also enables multiple network participants to send simultaneously. The problem in that regard is that switches are relatively expensive hardware components. It is therefore desirable to keep the number of switches as low as possible or to do without them altogether. However, not using switches means that multiple network participants (controllers) can no longer send simultaneously, and a data bus-like data transfer must be used, which means that the network participants may send alternately in a predetermined sequence recurrently within the scope of individual transmission slots (round-robin method).

In doing so, a limited data volume can be transferred in each transmission slot, which, in conjunction with the data rate underlying the network (e.g., 10 Mbit/s, 100 Mbit/s), sets a maximum duration of a transmission slot. However, a transmission slot does not necessarily have to be used by a network participant. If no data is to be transferred, the next transmission slot of the following network participant is used after a minimum period of time. Accordingly, the time between two transmission slots of a participant can sometimes vary greatly due to the variable duration of the transmission slots of the network participants. As a result, there is a chance that individual services at a client controller can only be offered with a delay and possibly late. However, if a service is not provided or offered on time, this may result in individual vehicle systems or client controllers actively looking for the service within the network within the scope of search messages. In others words, search messages are transmitted by a client controller or several client controllers into the network, in particular by multicast, which signal that one specific service or several specific services are needed at the client controller, in particular at least one vehicle system operated on the client controller. The transmission of search messages within the network can lead to increased network utilization, which in turn may affect the rapid and timely transmission of service offering messages.

Another challenge with respect to a service-oriented communication within a network consists in processing the responses received as part of a sent service offering message. For example, at least one service can be subscribed to by a large number of client controllers or vehicle systems operated on these client controllers, and, accordingly, numerous messages can be sent to the server controller as sender of the service offering message, which in turn have to be processed by the server controller. This can lead to resource bottlenecks on the server controller, which can delay the processing of individual responses or even cause these responses to be lost entirely. This can result in needed data being transferred late or not at all to customers, in particular client controllers.

If needed data is not provided to a client controllers, in particular to at least one vehicle system operated on the client controller, or is not provided in a timely manner, this can lead to error messages, malfunctions or failures of individual vehicle systems. This can lead to impairment of safety-relevant vehicle systems. The comfort of using the vehicle can also be significantly reduced by error messages and/or functional limitations of the vehicle. It is therefore clear that relevant vehicle data after being detected or generated should be distributed in the vehicle as simply, efficiently, needs-based and punctually as possible, in order to support smooth functioning of all vehicle systems.

BRIEF SUMMARY

Embodiments of the present disclosure overcome at least one of the above-described disadvantages at least partially. In particular, embodiments of the disclosure provide a method for operating a control system of a vehicle, a control system, a vehicle, a computer program product, a computer-readable storage medium and a data carrier signal enabling reliable, safe and/or improved data transfer between a plurality of controllers of the vehicle.

Embodiments of the present disclosure provide a method for operating a control system of a vehicle according to a first aspect of the present disclosure, by a control system for a vehicle according to a second aspect of the present disclosure, by a vehicle according to a third aspect of the present disclosure, by a computer program product according to a fourth aspect of the present disclosure, by a computer-readable storage medium according to a fifth aspect of the present disclosure, and by a data carrier signal according to a sixth aspect of the present disclosure. Further features and details of the disclosure emerge from the claims, the description and the drawings. Features and details that are described with regard to the method according to the disclosure, of course, also apply with regard to the vehicle according to the disclosure and/or with regard to the computer program product according to the disclosure and/ or with regard to the computer-readable storage medium according to the disclosure and/or with regard to the data carrier signal according to the disclosure, and vice versa in each case, so that in terms of the disclosure of the individual aspects of the disclosure, reference is or can always be made mutually.

According to the disclosure, provision is made for a method for operating a control system of a vehicle, comprising at least two controllers, wherein, for data transfer, the controllers are at least temporarily, in particular bidirectionally, communicatively linked via a network and wherein the data transfer in the network takes place according to a round-robin method, so that all controllers are assigned temporally consecutive transmission slots for data transfer and wherein at least one controller is configured, at least temporarily, as a server controller and wherein at least one controller is configured, at least temporarily, as a client controller, the method comprising:

determining a service offering at the server controller, in particular by the server controller, the service offering comprising at least one service available at the server controller, determining transfer time information, in particular by the server controller, wherein the transfer time information is characteristic of an earliest and/or latest start of the next transmission slot of the server controller, determining utilization information, in particular by the server controller, wherein the utilization information is characteristic of a current utilization of the server controller, dividing the service offering over one or more service offering messages depending on the transfer time information and the utilization information, in particular by the server controller, wherein each service offering message is characteristic of at least one service available at the server controller, transmitting the service offering message or service offering messages from the server controller to at least one client controller during at least one transmission slot assigned to the server controller, in particular from the server controller, wherein preferably each service offering message is transmitted in a separate transmission slot.

In other words, a method for operating a control system of a vehicle is proposed, wherein the control system comprises at least two controllers. The controllers are at least temporarily, in particular bidirectionally, communicatively linked via a network for data transfer, in particular Ethernet.

The data transfer within the network takes place according to a round-robin method, so that all controllers are assigned temporally consecutive transmission slots for data transfer. The round-robin method runs cyclically, so that after completion of a cycle in which each network participant had a transmission slot available, a new cycle with the same sequence of transmission slots of the respective network participants starts.

At least one controller of the control system is, in particular, at least temporarily, configured as a server controller or acts as such and at least one controller of the control system is, in particular, at least temporarily, configured as a client controller or acts as such. In the present case, a server controller shall be understood to mean a controller which, at least temporarily, offers or can offer at least one service in the network. Furthermore, a client controller shall be understood to mean a controller which, at least temporarily, requests or subscribes to at least one service in the network. Within the scope of the disclosure it may be provided that at least one controller is designed, in particular at least temporarily, to serve both as server controller and, in particular at least temporarily, as client controller. In other words, it may be provided that at least one controller can be both a requester and a consumer of services in the network. A method according to the disclosure can thus be used for several controllers of a control system, wherein, in particular, the respective method refers to operating the relevant controller as a server controller.

The method provides that a service offering is determined at the server controller, wherein the service offering comprises at least one service available through the server controller. A service can, in particular, involve providing data and/or information. This ensures that the server controller only offers services in the network that are actually available. For example, it may be provided that individual vehicle systems only become available after a longer operating time of the vehicle or only to certain times. The check of the availability of services at the server controller to be carried out in preparation of the transmission of a service offering message therefore helps to prevent errors and also allows the size of the service offering and thus also the size of the service offering message(s) generated on the basis of the service offering to be reduced to a minimum.

Furthermore, it is provided that transfer time information is determined, wherein the transfer time information is characteristic of an earliest and/or latest start of the next transmission slot of the server controller. In other words, it is determined when the server controller at earliest or at latest will be provided again with the opportunity to transfer in the network, for example, to transmit at least one service offering message. For this purpose, for example, it may be provided that an end time of the last transmission slot in conjunction with a minimal cycle duration and a maximum cycle duration is used in the round-robin method to determine the earliest or latest start of next transmission slot of the server controller. This is therefore a characteristic as to when a service offering at earliest or at latest can be made available to other network participants, in particular client controllers.

Within the scope of the disclosure it may be provided that start and end times of transmission slots are stored by at least one controller, in particular server controller or client controller. This allows access to the time history of the transmission slots made available to the controller. Additionally or alternatively, at least one controller, in particular a server controller, can store the point in time at which a service offering message was transmitted and which services were included in the service offering message. As a result, the time history of the services offered by the server controller can be easily accessed. In particular, it is easy to determine at what point in time a service was last offered in the network. Additionally or alternatively, at least one controller, in particular server controller, can store the point in time when a subscription confirmation was received and which service or services was or were subscribed to by which client controller by the subscription confirmation. This makes it possible to access the time history of the services subscribed to at the server controller.

It is further provided that utilization information is determined, wherein the utilization information is characteristic of a, in particular current, utilization of the server controller. In the present case, the utilization of the server controller shall be understood to mean a utilization of the server controller with respect to its storage and/or computing capacities.

Furthermore, the method provides that, depending on the determined transfer time information and the determined utilization information, the service offering is divided over one or more service offering messages, wherein each service offering message is characteristic of at least one service that is available at the server controller. The available services included in the service offering are thus, depending on the transfer time information and the utilization information, either offered or grouped in the network within the scope of a single service offering message and offered within the scope of several service offering messages in the network, preferably wherein each service offering message is transmitted in a separate transmission slot, i.e., at different times, to the remaining network participants (client controllers).

If, for example, the determination of the utilization information shows, that essential parts the resources of the server controller are in use, then the number of services offered within the scope of a service offering message can be reduced. If fewer services are offered in a service offering message, then, the number of subscription confirmations transmitted to the server controller by the client controllers within the network in response to the service offering message, which involve a subscription to one or more services from the service offering message is reduced. In this way, it can be ensured, that the number of responses received by the server controller can actually be processed in a timely manner.

If the determination of the transfer time information also shows that the next possible transfer of a service offering message is still relatively far in the future, the number of services offered within the scope of a service offering message can be increased or maximized to ensure that all services are offered as soon as possible and thus presumably in a timely fashion to the other network participants (client controllers). This evaluation can be based on the latest possible transfer point in time, which corresponds to a pessimistic assumption, or on the earliest possible transfer point in time, which corresponds to an optimistic assumption. Also, for example, a mean between earliest possible and latest possible point in time can be used a basis.

A method according to the disclosure offers the advantage that, with respect to the transmission of service offering messages within a network, both the network topology and resulting delays in the transmission and the available resources of the server controller serving as the sender of the service offering message are evaluated and taken into account in order to implement data transmission within the network as reliably, securely and efficiently as possible. Furthermore, the proposed method allows for optimized operation of networks within the scope of round-robin methods, thereby reducing the number of switches within the vehicle overall or to do without them.

Within the scope of the present disclosure, vehicle systems can be both providers of services and consumers of services (subscribers of services). At least one vehicle system can, at least partially, be configured as software application and preferably be operated on at least one controller. A plurality of vehicle systems can be operated on at least one controller, wherein each of the vehicle systems can provide at least one service and/or request or subscribe to at least one service. In particular, the receipt of a service offering at only a single client controller can already trigger a plurality of subscription confirmations.

It may be provided that, in response to the receipt of a service offering message at at least one client controller, at least one subscription confirmation is transmitted from the client controller to the server controller, which has transmitted the service offering message. The subscription confirmation is a characteristic that the client controller, in particular at least one vehicle system operated on the client controller, subscribes to at least one service from the service offering message.

It may be provided that at least one service offering message comprises at least one server controller identifier, the server controller identifier being characteristic of a specific server controller. This makes it easy to enable a client controller to transmit a subscription confirmation to the correct server controller. Additionally or alternatively it may be provided, that at least one subscription confirmation and/or at least one search message comprises a client controller identifier, wherein the client controller identifier is characteristic of a specific client controller. This makes it easy to enable a server controller, in response to a subscription confirmation or search message, to transmit the data corresponding to the subscribed and/or searched service to the correct client controller.

Within the scope of the disclosure, it may be provided that at least individual steps of the method are carried out recurrently. In particular, it may be provided, that the method is carried out cyclically when operating a control system, in particular with respect to at least one controller. Individual steps of the method can run at least partially simultaneously. Additionally or alternatively, it may be provided that at least individual steps of the method are computer-implemented, in particular that the method is a computer-implemented method.

It may also be provided that transmitting of at least one service offering message within the network takes place via multicast. In other words, the service offering message is transmitted from the server controller to the client controllers available in the network simultaneously or quasi simultaneously. In this way the advantage can be realized, that service offerings of the server controller may be provided at the client controllers at the same time or substantially at the same time. This ensures that an available service can be offered to all client controllers as quickly as possible. Furthermore, an expiration time of the service at the client controllers can be determined generally and thus more easily.

At least one service involves at least one the following:
   providing at least one vehicle parameter,
   providing at least one environmental parameter,
   providing at least one user parameter,
   providing at least one user setting.

In the present case, a vehicle parameter shall be understood to mean a parameter that is characteristic of a state of a vehicle. A vehicle parameter can, in particular, be at least one of the following:

a tire pressure of the vehicle, a position, in particular GPS position, of the vehicle, a speed of the vehicle, an acceleration rate or deceleration rate of the vehicle, a maintenance status of at least one component of the vehicle, a tank level of the vehicle, a charge level of at least one energy storage device, in particular a battery, of the vehicle, an oil level of the vehicle, a number of passengers in the vehicle, an opening status at least one flap, in particular a door or tank flap, and/or at least one window of the vehicle, a seatbelt status of at least one passenger of the vehicle, a steering angle of at least one steering wheel and/or at least one wheels of the vehicle, a position of at least one pedal, in particular accelerator pedal or brake pedal, of the vehicle.

In the present case, an environmental parameter shall be understood to mean a parameter, which is characteristic of the surroundings of the vehicle. An environmental parameter can, in particular, be at least one of the following:

an ambient temperature, an ambient humidity, an ambient pressure, an ambient brightness, information about a surface underneath a vehicle, in particular road surface, distance information about at least one vehicle ahead or behind, blind spot information about at least one vehicle that is at least partially adjacent, a course of a road or track, in particular detected by the vehicle, a position and/or contour characteristics of at least one obstacle, in particular, detected by the vehicle.

In the present case, a user parameter shall be understood to mean a parameter that is characteristic of a user of the vehicle. A user parameter can in particular be at least one of the following:

a vital function of a user, a state of fatigue of a user, a weight of a user, a height of a user.

In the present case, a user setting shall be understood to mean a parameter, that is characteristic of a setting of the user at the vehicle, i.e., characterizing in particular a specific selection of a user with respect to several setting options at the vehicle. A user setting can, in particular, be at least one of the following:

a chassis setting, in particular a sport mode or comfort mode, a unit setting, in particular a setting of a unit of speed, preferably km/h or mph, a seat setting, a steering wheel position, an interior temperature, a status of at least one seat heating of the vehicle, a position or location of at least one mirror of the vehicle.

The disclosure is not limited to the above-mentioned vehicle parameters, environmental parameters, user parameters and/or user settings.

Within the scope of the disclosure, it can be advantageous that determining a service offering at the server controller comprises at least one of the following:

determining a current availability of at least one service, determining the future availability of the service at a future point in time, the future point in time being characteristic of the, in particular presumable, start of the next transmission slot assigned to the server controller, including said service in the service offering, provided said service is current and will be available in the future.

In other words, it can first be determined whether the service is currently available. Furthermore, it may be provided that it is determined whether the service will also be available in the future. In particular, it may be provided in this regard, for example, that it is known, that a specific vehicle system (as provider of the service) will be switched off in the future, in particular at a known point in time. If this point in time is before the future point in time, for example, the service can no longer be offered, since a subscription to this service by a client controller, in particular at least one vehicle system of the client controller, would otherwise result in an error. Thus, it may be provided, that the service is included in the service offering and subsequently also offered in the network only, provided that the service is not only currently available but also in the future.

The future point in time can be determined to be the point in time at which the next transmission slot of the server controller presumably starts. Thus, the future point in time can coincide with the transfer time information or be determined from it. Furthermore, when determining the future point in time, an additional time buffer may be taken into account to determine the future point in time. This ensures, that the relevant service will also be available beyond the start of the next transmission slot at least for a limited time. In particular, the time buffer can therefore be added to the point in time at which the next transmission slot of the server controller presumably starts, to define the future point in time.

Within the scope of the disclosure, it is conceivable that at least one of the following is additionally comprised:

determining a last transfer point in time of at least one service available at the server controller, wherein the last transfer point in time is characteristic of the point in time at which the service was last transmitted to at least one client controller and in particular was subscribed to by at least one client controller, querying a time to live of the service and calculating a remaining time until the expiration of the time to live of the service at the client controller that has subscribed to the service, taking into account the remaining time when dividing the service offering over one or more service offering messages and/or prioritizing at least one service offering message depending on the remaining time with respect to a temporal transmission of the service offering message.

In other words, with respect to at least a service, it can be determined when this service was last offered in the network and, in particular, also was subscribed to by at least one client controller, in particular at least one vehicle system operated on the client controller. Furthermore, it may be provided, that a time to live of the service is queried with respect to this service. The time to live may be provided directly by the service or by at least one vehicle system serving as a provider of the service. Within the scope of the disclosure it may be provided that the service offering comprises at least a time to live of a service comprised by the service offering. A time to live shall be understood to mean a duration during which a reliable data transmission by the service can be guaranteed from the time the service is offered at a client controller. Based on the time to live and the last transfer point in time, an expiration point in time can thus be calculated, wherein the expiration point in time is characteristic of an expiration of the time to live of the service at the client controller which has subscribed to the service. An expiration of the time to live of a service at a client controller can, for example, lead to the client controller assuming that data transmission within the scope of the service can no longer take place. Accordingly, this can trigger malfunctions or error messages. Therefore, there is a desire that a service is offered anew at the client controller before the expiration point in time is reached and can be subscribed to by said client controller to ensure a continuous and needs-based supply of data.

The calculated expiration point in time can be taken into account when dividing the service offering over one or more service messages. In particular, the remaining time can be compared with at least one remaining time limit. If the remaining time falls below or reaches the remaining time limit, the relevant service can preferably be isolated in a service offering message and/or combined with comparatively few, in particular a maximum of ten or a maximum of five or a maximum of three or a maximum of one, service or services in one service offering message. This can support rapid processing of any subscription confirmation in response to the service offering message and rapid supplying the relevant client controller with data. Additionally or alternatively, depending on the remaining time, a temporal prioritization of the service offering message containing the relevant service can take place. In particular, it may be provided, that if the remaining time falls below or reaches the remaining time limit, the service offering message with the relevant service is given a higher priority in terms of its temporal transmission, i.e., the service offering message is transmitted earlier in time than other service offering messages. This supports that the service may be provided anew at the client controller as rapidly as possible and before the time to live expires, and can be subscribed to. This makes it easier to avoid a breakdown of communication links and the occurrence of errors and error messages.

Within the scope of the disclosure, it may be provided, that additionally at least one the following is comprised:

determining a subscription forecast for at least one service available at the server controller, wherein the subscription forecast is characteristic of a number of subscription confirmations with respect to the service potentially to be expected at said server controller, determining a utilization forecast depending on the subscription forecast, wherein the utilization forecast is characteristic of an additional utilization of the server controller by one of a number of subscription confirmations according to the subscription forecast, taking into account the utilization forecast when dividing the service offering over one or more service offering messages and/or prioritizing at least one service offering message depending on the utilization forecast with respect to a temporal transmission of the service offering message.

In other words, it may be provided that a subscription forecast is determined for at least one service comprised by the service offering. The subscription forecast indicates how many subscription confirmations are to be expected at the server controller in response to sending the service within the scope of a service offering message. For this purpose, it can be evaluated, for example, how many participants are active in the network. The activity can be determined, for example, by evaluating whether a network participant regularly utilizes its transmission slot to transfer data or lets it expire. This can in turn be determined based on the cycle times of the round-robin method. Additionally or alternatively, it can be evaluated, how many client controllers, in particular vehicle systems, have subscribed to the service on average in response to its offering in the network in the past. In other words, it can be evaluated how many subscription confirmations were received on average by the server controller when the service was offered in the network.

Depending on the subscription forecast, a utilization forecast can be determined which is characteristic of an additional utilization of the server controller by processing a number of subscription confirmations according to the subscription forecast. The additional utilization can relate to a utilization of storage and/or computing capacities of the server controller.

The utilization forecast can be taken into account when dividing the service offering over one or more service offering messages. In particular, it may be provided that, if a service presumably requires a high additional utilization of the server controller, this service is isolated in a service offering message and/or combined with comparatively few, in particular a maximum of ten or a maximum of five or a maximum of three or a maximum of one, service or services in one service offering message. This ensures that a maximum utilization of the server controller is not exceeded and all subscription confirmations received in response to a sent service offering message can be processed correctly and are not partially lost. This in turn allows to support reliable and secure data communication within the network and thus error-free operation of the vehicle. Additionally or alternatively, depending on the utilization forecast, a temporal prioritization of the service offering message which includes the relevant service. For this purpose, the utilization forecast can be compared with the utilization information. If the utilization resulting from a combination of the utilization information and the utilization forecast exceeds a maximum utilization of the server controller, then sending the service offering message can be postponed, for example, until a current utilization of the server controller has decreased. On the other hand, in the event of a currently low utilization of the server controller, services with a high utilization forecast can be temporally prioritized in such a way that they are offered as quickly as possible.

Within the scope of the disclosure, it may be provided, that determining the subscription forecast comprises at least the following:

evaluating at least one search message received at the server controller, wherein the search message is characteristic of at least one client controller, in particular at least one vehicle system operated on the client controller, searching for at least one service.

Within the scope of the evaluation, it can be determined, for example, whether the service to which the search message refers, can currently be offered by the server controller or is part of the service offering. Should this be the case, it can be assumed that at least the client controller, which has transmitted the search message, will subscribe to the service after sending the service offering message. In this respect, the evaluation of the search message(s) received by the server controller can help to improve a subscription forecast.

It is further conceivable, that determining transfer time information comprises at least one of the following:

determining a data transfer rate of the network and determining a number of participants in the network and calculating the earliest and/or latest start of the next transmission slot of the server controller depending on the data rate and/or the number of participants.

The data transfer rate can preferably be detected based on the network type, for example, 10 Mbit/s Ethernet or 100 Mbit/s Ethernet. The number of participants in the network can be determined, for example, by the server controller reading IP addresses within the network. Alternatively, the number of participants can be requested directly from the network driver. Alternatively, the number of participants can be determined by evaluating the cycle times of the round-robin method. In this regard at least a maximum and minimum number of participants can be determined based on a known minimum and maximum duration of a transmission slot for each cycle. From the data transfer rate of the network in conjunction with a maximum amount of data that can be transferred within a transmission slot, which is known to all network participants, a maximum duration of a transmission slot can be determined. Furthermore, in a round-robin method, a minimum duration of a transmission slot is known, which is equivalent to a waiver of the transfer option by the relevant network participant. Knowing the number of participants and the premise that each participant in the course of a cycle may send only once, an earliest start of the next transmission slot of the server controller can be determined based on the minimum duration of a transmission slot and the number of participants, and, based on the maximum duration of a transmission slot and the number of participants, the latest start of the next transmission slot of the server controller can be determined.

It is further conceivable, that at least the following is comprised:

determining a transfer time forecast with respect to at least one service offering message, wherein the transfer time forecast is characteristic of a round-trip time of the service offering message.

The round-trip time shall be understood to mean the time that elapses from the sending of a service offering message until a subscription confirmation sent by a client controller in response to this service offering message reaches the server controller. Based on the round-trip time it can be estimated, how much time the server controller has between sending a service offering message and receiving corresponding responses. The transfer time forecast can, for example, be determined by evaluating historic data. For example, an average with respect to the previous transfer of service offering messages can be determined. Depending on the round-trip time the service offering message can be prioritized temporally. In particular, it may be provided, that, if the transfer time forecast suggests a comparatively long transfer time, the aim is to transmit the service offering message as early as possible.

It is also conceivable, that determining utilization information comprises at least one of the following:

determining a utilization of at least one working memory of the server controller, determining a utilization of at least one computing unit, in particular at least one processor, of the server controller, determining a utilization of at least one, in particular non-volatile, data memory of the server controller.

In the present case, it is further conceivable, that the following is comprised:

determining a data volume forecast for the service offering and taking into account the data volume forecast when dividing the service offering over one or more service offering messages.

The data volume forecast can preferably be characteristic of a data volume generated by a service offering message, which includes the entire service offering. In particular, the data volume forecast can be compared with a maximum data volume that can be transmitted in a transmission slot. The data volume forecast can be taken into account when dividing the service offering over one or more service offering messages. In particular, if the maximum data volume is exceeded by the data volume forecast, the service offering can be divided over several service offering messages.

Within the scope of the disclosure it is optionally possible, that additionally at least one of the following is comprised:

comparing the number of services comprised by the service offering with a limit and dividing the service offering over several service offering messages if the number of services comprised by the service offering exceeds the limit.

In other words, several service offering messages may be provided from the outset if the number of services to be offered exceeds a limit. The limit can preferably be defined as a function of a maximum data volume that can be transferred within a transmission slot.

Within the scope of the disclosure, it may be provided that the network is designed free of switches. In other words, it may be provided that the network does not comprise a switch. Additionally or alternatively, it may be provided within the scope of the disclosure that the network is designed as an Ethernet, in particular a 10 Mbit/s Ethernet, wherein preferably the communication within of network takes place in a multi-drop mode (PLCA mode, Physical Layer Collision Avoidance mode).

The above object is further achieved by a control system according to the disclosure for a vehicle according to the second aspect of the present disclosure, comprising at least two controllers, wherein, for data transfer, the controllers are at least temporarily, in particular bidirectionally, communicatively linked via a network and wherein at least one controller is configured, at least temporarily, as a server controller or acts as such, and wherein at least one controller is configured, at least temporarily, as a client controller, or acts as such, and wherein the control system is operated according to a method according to the first aspect of the present disclosure.

In the present case, at least one controller can comprise means for data processing. The means for data processing can preferably comprise at least one working memory and/or at least one computing unit, in particular at least one processor, and/or at least one, in particular non-volatile data memory. The means for data processing of at least one controller can be configured to carry out a method according to the first aspect of the present disclosure.

As a result, with respect to a control system according to the disclosure, the same advantages are obtained as have already been described with respect to a method according to the disclosure.

The above object is further achieved by a vehicle according to the disclosure.

As a result, with respect to a vehicle according to the disclosure, the same advantages are obtained as have already been described with respect to a method according to the disclosure and/or a control system according to the disclosure.

Within the scope of the disclosure, it can preferably be provided that the vehicle is designed as a car, in particular a passenger car, a motorcycle or a truck. Alternatively, it is conceivable, that the vehicle is designed as a, in particular agricultural, commercial vehicle, in particular a tractor or combine harvester. The vehicle can also be designed as a construction machine, in particular as an excavator or a wheel loader.

The above object is further achieved by a computer program product according to the disclosure according to the fourth aspect of the present disclosure. The computer program product comprises instructions which cause a control system according to the second aspect of the disclosure, in particular at least one controller of the control system, to carry out a method according to the first aspect of the present disclosure.

As a result, with respect to a computer program product according to the disclosure, the same advantages are obtained as have already been described with respect to a method according to the disclosure and/or a control system according to the disclosure and/or a vehicle according to the disclosure.

The above object is further achieved by a non-transitory computer-readable storage medium according to the fifth aspect of the present disclosure, wherein a computer program product according to the fourth aspect of the present disclosure.

As a result, with respect to a computer-readable storage medium according to the disclosure, the same advantages are obtained as have already been described with respect to a method according to the disclosure and/or a control system according to the disclosure and/or a vehicle according to the disclosure and/or a computer program product according to the disclosure.

The above object is further achieved by a data carrier signal according to the disclosure according to the sixth aspect of the present disclosure, wherein the data carrier signal transfers a computer program product according to the fourth aspect of the present disclosure.

As a result, with respect to a data carrier signal according to the disclosure, the same advantages are obtained as have already been described with respect to a method according to the disclosure and/or a control system according to the disclosure and/or a vehicle according to the disclosure and/or a computer program product according to the disclosure and/or a computer-readable storage medium according to the disclosure.

BRIEF DESCRIPTION OF THE SEVERAL VIEWS OF THE DRAWINGS

Further advantages, features and details of the disclosure result from the following description, in which, with reference to the drawings, several exemplary embodiments of the disclosure are described in detail. The features mentioned in the claims and in the description may be advantageous either individually or in any combination. In the figures:

FIG. 1 shows a schematic view of a method,

FIG. 2 shows a schematic view of a control system,

FIG. 3 shows a schematic view of a round-robin method,

In the figures, identical reference numerals are used for the same technical features, even for different exemplary embodiments.

DETAILED DESCRIPTION

Figure 4:
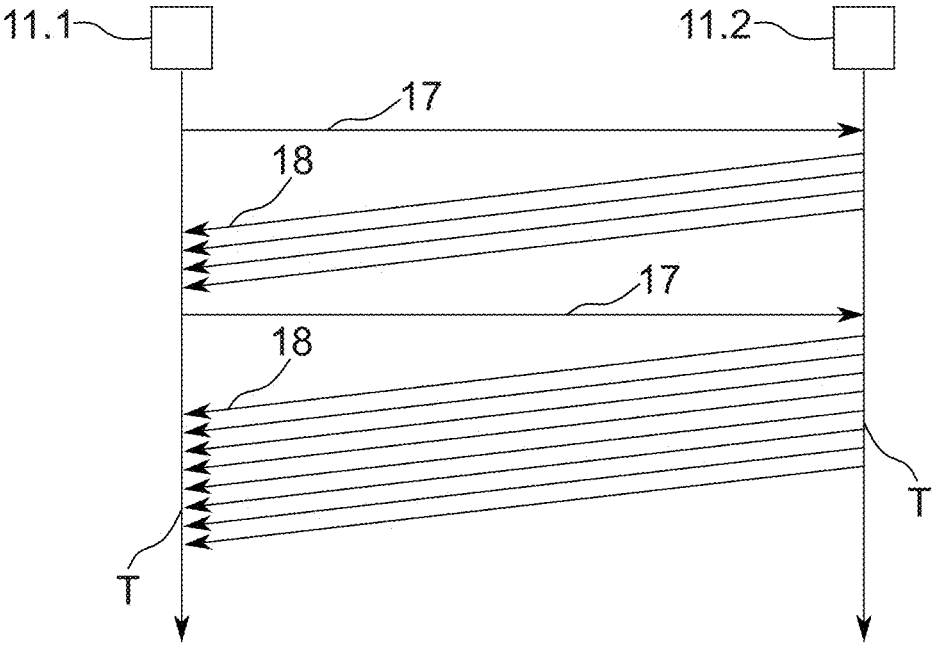
FIG. 4 shows a schematic view of a service-oriented communication.

FIG. 1 shows a schematic view of a method 100 for operating a control system 10 of a vehicle 50, comprising at least two controllers 11, wherein, for data transfer, controller 11 are at least temporarily communicatively linked via a network 12 and wherein the data transfer in network 12 takes place according to a round-robin method, so that all controller 11 are assigned temporally consecutive transmission slots 13 for data transfer and wherein at least one controller 11 is configured, at least temporarily, as a server controller 11.1 and wherein at least one controller 11 is configured, at least temporarily, as a client controller 11.2, the method 100 comprising:

determining 110 a service offering at server controller 11.1, the service offering comprising at least one service available at server controller 11.1, determining 120 transfer time information, wherein the transfer time information is characteristic of an earliest and/or latest start of next transmission slot 13 of server controller 11.1, determining 130 utilization information, wherein the utilization information is characteristic of a current utilization of server controller 11.1, dividing 140 the service offering over one or more service offering messages 17 depending on the transfer time information and the utilization information, wherein each service offering message 17 is characteristic of at least one service available at the server controller 11.1, transmitting 150 service offering message 17 from server controller 11.1 to at least one client controller 11.2 during at least one transmission slot 13 assigned to server controller 11.1, wherein, in particular, each service offering message 17 is transmitted in a separate transmission slot 13.

Furthermore, FIG. 2 shows a schematic view of a control system 10 of a vehicle 50. Control system 10 comprises at least two controllers 11, wherein controllers 11 are communicatively linked via a network 12, wherein at least one controller 11 is configured as a server controller 11.1 and wherein at least one controller 11 is configured as a client controller 11.2.

Controllers 11 comprise means for data processing, which in turn comprise a working memory 14, a computing unit 15 and also a data memory 16. The means for data processing are configured, in particular at least with respect to server controller 11.1, to carry out a method 100 according to the first aspect of the present disclosure.

The data transmission in network 12 is carried out according to a round-robin method, which is shown schematically in FIG. 3. It can be seen that all controller 11 are assigned temporally consecutive transmission slots 13 for data transfer within network 12. Outside of respective transmission slot 13, no data transfer of the respective controller 11 takes place. The one-time run of all transmission slots 13 is referred to as a cycle. After the last transmission slot 13 of a cycle has ended, the next cycle starts again with transmission slot 13 with which the previous cycle began. The duration of a cycle (cycle length Z) is thus determined by the cumulative duration of individual transmission slots 13. The respective duration of a transmission slot 13 can vary from cycle to cycle. It depends, in particular, whether a controller 11 transfers data within its assigned transmission slot 13 at all and if so, the data volume transferred.

FIG. 4 shows a schematic view of a service-oriented communication within network 12 between a server controller 11.1 and a client controller 11.2. It can be seen, that the client controller 11.2 recurrently, in particular cyclically, transmits service offering messages 17 to client controller 11.2 via network 12. In response to received service offering message 17, subscription confirmations 18 are transmitted from client controller 11.2 to server controller 11.1, whereby, in each case, at least one service offered by server controller 11.1 is subscribed to by client controller 11.2, in particular at least by one vehicle system operated on client controller 11.2. Subsequently, server controller 11.1 will transmit, at least for a limited period of time, data related to the subscribed services (e.g., tire pressure, GPS position of vehicle 50, etc.) to client controller 11.2 or to the relevant vehicle system operated by the client controller 11.2. Subscription confirmations 18 must therefore be processed by server controller 11.1 in order to establish or maintain corresponding data links to client controller 11.2.

For the sake of clarity, only one client controller 11.2 is shown in FIG. 4. However, service offering messages 17 could also be transmitted simultaneously or quasi-simultaneously, in particular via multicast, to several client controllers 11.2 in network 12. This can subsequently trigger a correspondingly larger number of subscription confirmations 18.

Figure 5:
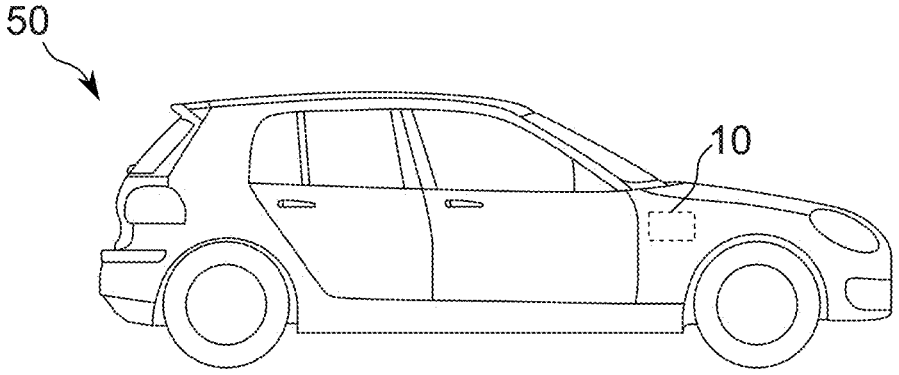
FIG. 5 shows a schematic view of a vehicle.

FIG. 5 shows further one schematic illustration of a vehicle 50, wherein vehicle 50 comprises at least one control system 10 according to the second aspect of the present disclosure. In the present case, vehicle 50 is designed as a car.

German patent application no. 102023131530.7, filed Nov. 13, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a control system of a vehicle that includes a plurality of processors, wherein, for data transfer, the processors are at least temporarily communicatively linked via a network, wherein the data transfer in the network takes place according to a round-robin method, so that all of the processors are assigned temporally consecutive transmission slots for data transfer, wherein at least one of the processors is configured, at least temporarily, as a server controller, and wherein at least one of the processors is configured, at least temporarily, as a client controller, the method comprising:

determining a service offering at the server controller, the service offering comprising at least one service available at the server controller;

determining transfer time information, wherein the transfer time information is characteristic of an earliest and/or latest start of a next transmission slot of the server controller;

determining utilization information, wherein the utilization information is characteristic of a current utilization of the server controller;

dividing the service offering over one or more service offering messages based on the transfer time information and the utilization information, wherein each of the service offering messages is characteristic of at least one service available at the server controller; and transmitting at least one of the service offering messages from the server controller to the client controller during at least one transmission slot assigned to the server controller, wherein, each of the service offering messages is transmitted in a separate transmission slot.

2. The method according to claim 1, wherein at least one service involves at least one of:

providing at least one vehicle parameter, providing at least one environmental parameter, or providing at least one user parameter.

3. The method according to claim 1, wherein determining the service offering at the server controller comprises at least one of:

determining a current availability of at least one service, determining a future availability of at least one service at a future point in time, the future point in time being characteristic of the start of the next transmission slot assigned to the server controller, or including the service in the service offering, if the service is current and will be available in the future.

4. The method according to claim 1, further comprising:

determining a last transfer point in time of at least one service available at the server controller, wherein the last transfer point in time is characteristic of a point in time at which the service was last transmitted to the client controller and was subscribed to by the client controller, querying a time to live of the service and calculating a remaining time until expiration of the time to live of the service at the client controller that has subscribed to the service; and taking into account the remaining time when dividing the service offering over one or more service offering messages and/or prioritizing at least one of the service offering based on the remaining time with respect to a temporal transmission of the one or more service offering messages.

5. The method according to claim 1, further comprising:

determining a subscription forecast for at least one service available at the server controller, wherein the subscription forecast is characteristic of a number of client controllers that potentially subscribe to the service;

determining a utilization forecast based on the subscription forecast, wherein the utilization forecast is characteristic of an additional utilization of the server controller by processing a number of subscription confirmations according to the subscription forecast;

taking into account the utilization forecast when dividing the service offering over one or more service offering messages and/or prioritizing at least one service offering message based on the utilization forecast with respect to a temporal transmission of the one or more service offering messages.

6. The method according to claim 1, wherein determining the transfer time information comprises at least one of:

determining a data transfer rate of the network, determining a number of participants in the network, or calculating the earliest and/or latest start of the next transmission slot of the server controller based on a data rate and the number of participants.

7. The method according to claim 1, further comprising:

determining a transfer time forecast with respect to at least one of the service offering messages, wherein the transfer time forecast is characteristic of a round trip time of the at least one of the service offering messages.

8. The method according to claim 1, wherein determining the utilization information comprises at least one of:

determining a utilization of at least one working memory of the server controller, determining a utilization of the at least one of the processors that is configured as the server controller, or determining a utilization of at least one data memory of the server controller.

9. The method according to claim 1, further comprising:

determining a data volume forecast for the service offering and taking into account the data volume forecast when dividing the service offering over one or more service offering messages.

10. The method according to claim 1, wherein the network is an Ethernet network, wherein communication within the network takes place in a multi-drop mode.

11. A control system for a vehicle, the control system comprising:

a plurality of processors, wherein, for data transfer, the processors are at least temporarily communicatively linked via a network, wherein at least one of the processors is configured as a server controller, wherein at least one of the processors is configured as a client controller, and wherein the control system, in operation:

determines a service offering at the server controller, the service offering comprising at least one service available at the server controller;

determines transfer time information, wherein the transfer time information is characteristic of an earliest and/or latest start of a next transmission slot of the server controller;

determines utilization information, wherein the utilization information is characteristic of a current utilization of the server controller;

divides the service offering over one or more service offering messages based on the transfer time information and the utilization information, wherein each of the service offering messages is characteristic of at least one service available at the server controller; and transmits at least one of the service offering messages from the server controller to the client controller during at least one transmission slot assigned to the server controller, wherein, each of the service offering messages is transmitted in a separate transmission slot.

12. A vehicle comprising:

the control system according to claim 11.

13. A non-transitory computer-readable storage medium storing instructions for a control system of vehicle that includes a plurality of processors, wherein, for data transfer, the processors are at least temporarily communicatively linked via a network, wherein the data transfer in the network takes place according to a round-robin method, so that all of the processors are assigned temporally consecutive transmission slots for data transfer, wherein at least one of the processors is configured, at least temporarily, as a server controller, wherein at least one of the processors is configured, at least temporarily, as a client controller, and wherein the instructions, when executed by one or more of the processors, cause the control system to:

determine a service offering at the server controller, the service offering comprising at least one service available at the server controller;

determine transfer time information, wherein the transfer time information is characteristic of an earliest and/or latest start of a next transmission slot of the server controller;

determining utilization information, wherein the utilization information is characteristic of a current utilization of the server controller;

divide the service offering over one or more service offering messages based on the transfer time information and the utilization information, wherein each of the service offering messages is characteristic of at least one service available at the server controller; and transmit at least one of the service offering messages from the server controller to the client controller during at least one transmission slot assigned to the server controller, wherein, each of the service offering messages is transmitted in a separate transmission slot.

* * * * *